(12) United States Patent
Taki et al.

(10) Patent No.: US 12,141,568 B2
(45) Date of Patent: Nov. 12, 2024

(54) UPDATE MANAGEMENT SERVER, UPDATE MANAGEMENT METHOD, AND COMPUTER-READABLE STORAGE MEDIUM

(71) Applicant: HONDA MOTOR CO., LTD., Tokyo (JP)

(72) Inventors: Tomoaki Taki, Tokyo (JP); Koichiro Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 17/671,606

(22) Filed: Feb. 15, 2022

(65) Prior Publication Data

US 2022/0300270 A1    Sep. 22, 2022

(30) Foreign Application Priority Data

Mar. 19, 2021   (JP) .................................. 2021-046454

(51) Int. Cl.
| | | |
|---|---|---|
| G06F 8/65 | (2018.01) | |
| B60W 40/105 | (2012.01) | |
| G06F 8/71 | (2018.01) | |

(52) U.S. Cl.
CPC .............. *G06F 8/65* (2013.01); *B60W 40/105* (2013.01); *G06F 8/71* (2013.01); *B60W 2554/4049* (2020.02)

(58) Field of Classification Search
CPC .......... G06F 8/65; G06F 8/71; B60W 40/105; B60W 2554/4049

(Continued)

(56) References Cited

U.S. PATENT DOCUMENTS

| | | |
|---|---|---|
| 9,575,743 B1 | 2/2017 | Chun |
| 2011/0196572 A1 | 8/2011 | Tsuchikiri |

(Continued)

FOREIGN PATENT DOCUMENTS

| | | |
|---|---|---|
| CN | 106790367 A | 5/2017 |
| CN | 107480051 A | 12/2017 |
| JP | 2020027666 A | 2/2020 |

OTHER PUBLICATIONS

Sarwar et al., "Network of ECUs Software Update in Future Vehicles", 2019, [Online], pp. 1-5, [Retrieved from internet on May 16, 2024], <https://ieeexplore.ieee.org/stamp/stamp.jsp?arnumber=8895162> (Year: 2019).*

(Continued)

*Primary Examiner* — S. Sough
*Assistant Examiner* — Zengpu We

(57) ABSTRACT

An update management device includes: an acquisition unit configured to acquire, version information of a program of a moving object control unit, and moving object information which is detected information; and a generation unit configured to generate normal range information indicating a normal range of the moving object information, wherein the generation unit is configured to generate, based on the moving object information detected by a moving object whose program of the moving object control unit is a first version, normal range information of the first version, and identify, a moving object whose moving object information detected when the version of the program is the first version is within the normal range of the first version, and use the moving object information detected by the identified moving object when the version of the program is the second version, to generate the normal range information of the second version.

17 Claims, 12 Drawing Sheets

(58) Field of Classification Search
USPC .......................................................... 717/168
See application file for complete search history.

(56) References Cited

U.S. PATENT DOCUMENTS

| | | | |
|---|---|---|---|
| 2017/0178038 A1 | 6/2017 | Guven | |
| 2017/0345231 A1 | 11/2017 | Kumabe | |
| 2019/0325666 A1* | 10/2019 | Teraoka | G07C 5/0808 |
| 2020/0102929 A1 | 4/2020 | Sata | |
| 2020/0125354 A1* | 4/2020 | Kim | G06F 11/0754 |
| 2021/0191661 A1 | 6/2021 | Harata | |
| 2022/0066770 A1* | 3/2022 | Jeong | G07C 5/085 |

OTHER PUBLICATIONS

Office Action issued for counterpart Chinese Application 202210095308.3, issued by The State Intellectual Property Office of People's Republic of China on Sep. 23, 2024.

\* cited by examiner

| VIN | PROGRAM VERSION 1 | PROGRAM VERSION 2 | SENSOR DATA |
|---|---|---|---|
| 1 | V1 | V1 | D1 |
| 1 | V2 | V1 | D2 |
| 2 | V1 | V1 | D3 |
| 2 | V2 | V1 | D4 |
| ... | ... | ... | ... |

FIG.4

| VIN | PROGRAM VERSION 1 | PROGRAM VERSION 2 | HARDWARE TYPE | SENSOR DATA |
|---|---|---|---|---|
| 1 | V1 | V1 | H1 | D1 |
| 1 | V2 | V1 | H1 | D2 |
| 2 | V1 | V1 | H2 | D3 |
| 2 | V2 | V1 | H2 | D4 |
| ... | ... | ... | ... | ... |

FIG.10

UPDATE MANAGEMENT SERVER, UPDATE MANAGEMENT METHOD, AND COMPUTER-READABLE STORAGE MEDIUM

The contents of the following Japanese patent application (s) are incorporated herein by reference:
NO. 2021-046454 filed on Mar. 19, 2021.

BACKGROUND

1. Technical Field

The present invention relates to an update management server, an update management method, and a computer-readable storage medium.

2. Related Art

Patent Document 1 discloses an ECU that is able to rewrite an application program as an ECU for a vehicle.
Patent Document 1: Japanese Patent Application Publication No. 2020-27666

BRIEF DESCRIPTION OF THE DRAWINGS

FIG. 4 shows an example of a data structure of sensor information which is managed by the update management server 70.

FIG. 10 shows a data structure of sensor information in a modification example in a table format.

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
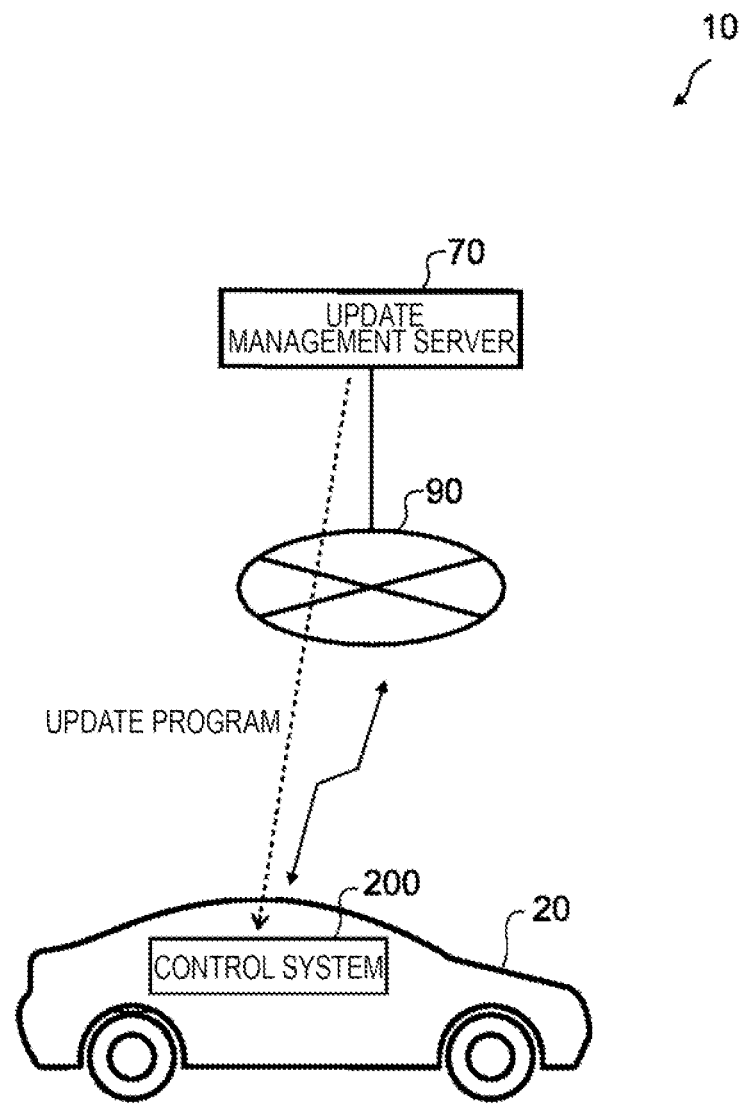
FIG. 1 schematically shows an update system 10 according to an embodiment.

FIG. 1 schematically shows an update system 10 according to an embodiment. The update system 10 includes a vehicle 20 and an update management server 70. The vehicle 20 includes a control system 200. The control system 200 is responsible for controlling the vehicle 20 and a communication with the update management server 70 through a communication network 90. The communication network 90 includes an IP network such as the Internet, a P2P network, a dedicated line including a VPN, a virtual network, a mobile communication network, and the like.

In the vehicle 20, the control system 200 includes a plurality of ECUs (Electronic Control Units) that control the vehicle 20. The control system 200 acquires an update program of an ECU of the control system 200 from an outside. For example, the control system 200 receives the update program which is transmitted from the update management server 70 via wireless communication through the communication network 90. The control system 200 reprograms the ECU of the control system 200 by rewriting a program, which is executed by the ECU of the control system 200, by the update program. Such reprogramming is performed for the purpose of upgrading a function of the ECU of the control system 200, or the like. In this way, the control system 200 updates the ECU by reprogramming the ECU by OTA (Over The Air). In the present embodiment, rewriting the program, which is executed by a device such as the ECU or the like, by the update program, is referred to as a "program update".

The update management server 70 transmits update programs to a plurality of vehicles including the vehicle 20. The update management server 70 collects sensor data detected by the vehicle from the plurality of vehicles including the vehicle 20.

For example, the control system 200 collects information detected by various sensors provided in the vehicle 20. For example, the control system 200 collects sensor data detected by an exhaust sound sensor, an engine speed sensor, or the like. The control system 200 transmits, to the update management server 70, the sensor data detected by the various sensors along with current version information of the program that controls the ECU of the control system 200. The update management server 70 generates a distribution model of the sensor data for each version of the program of the ECU by using the sensor data collected from a large number of vehicles, and determines normal range information indicating a normal range of the sensor data for each version by using the distribution model. The update management server 70 notifies a user of a vehicle, by which sensor data deviating from the normal range is detected, of a message urging for a dealer to check the vehicle.

Here, after performing the program update of the ECU of the vehicle 20, the control system 200 transmits the sensor data along with a new version of the ECU to the update management server 70. In a case where the sensor data detected by the vehicle 20 before the program update falls within the normal range of the previous version, the update management server 70 uses the sensor data acquired from the vehicle 20 after the program update to generate the normal range information of the new version. Performing the program update of the ECU may change the normal range of the sensor data. With the update management server 70, also in the system that performs the program update, it is possible to generate the normal range information of the new version by using sensor data of a vehicle having a comparatively high probability of being normal.

Figure 2:
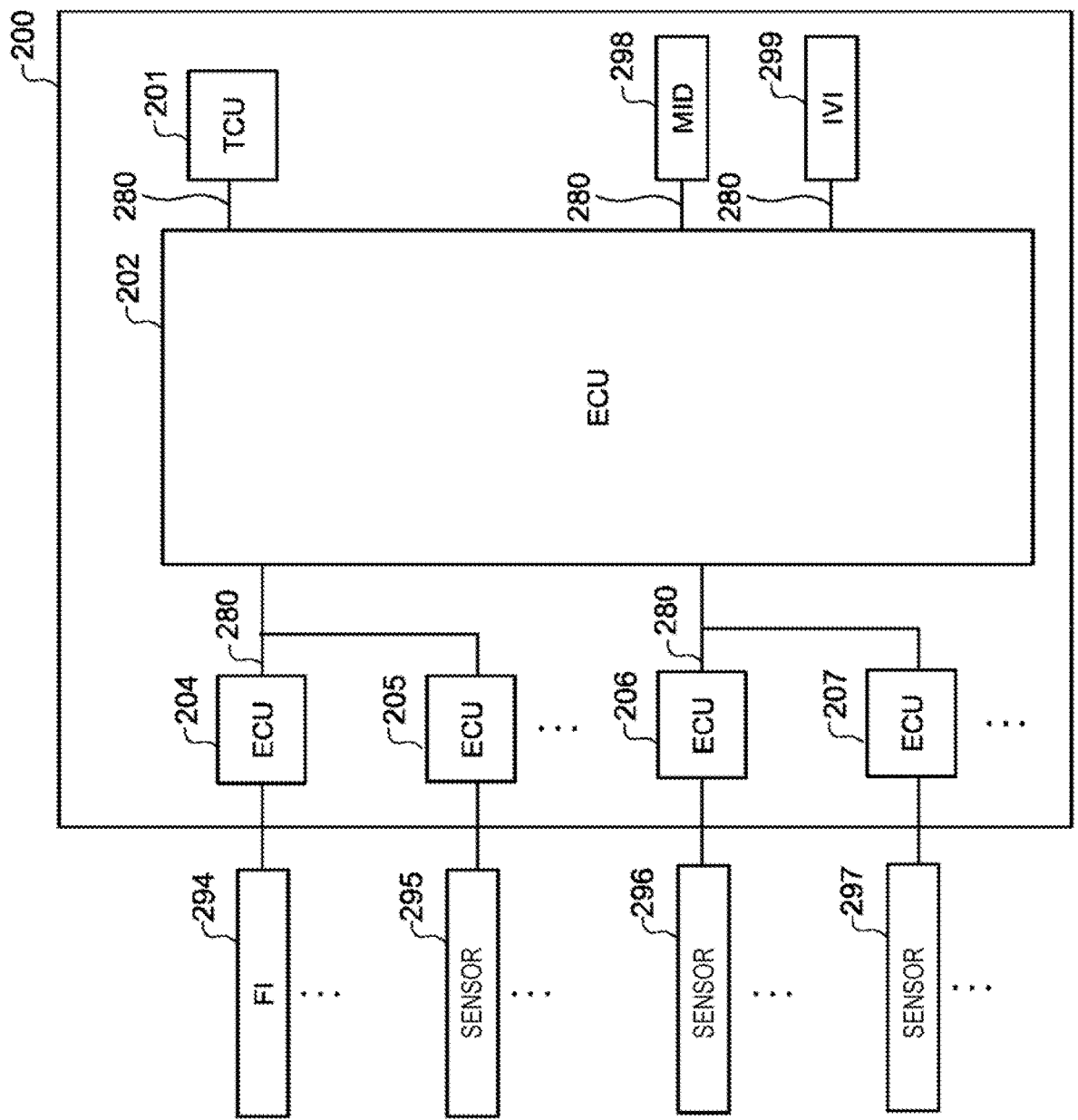
FIG. 2 schematically shows a system configuration of a control system 200 along with a device to be controlled.

FIG. 2 schematically shows a system configuration of a control system 200 along with a device to be controlled. The control system 200 includes a TCU 201, an ECU 202, an ECU 204, an ECU 205, an ECU 206, a MID 298, and an IVI 299.

The ECU 202 communicates with the TCU 201, the ECU 204, the ECU 205, the ECU 206, and an ECU 207, and the MID 298 and the IVI 299 through a communication network 280. The ECU 202 controls the TCU 201, the ECU204, the ECU 205, the ECU 206, and the ECU 207, and the MID298 and the IVI 299 in an integrated manner. The communication network 280 may be configured to include, for example, a CAN, an Ethernet (Registered Trademark) network, or the like.

The TCU201 is a telematics control unit (Telematics Control Unit). The TCU 201 is mainly responsible for a mobile communication. The TCU 201 transmits and receives data to and from the update management server 70 based on the control of the ECU 202. The TCU 201 receives the update program transmitted from the update management server 70 via the mobile communication based on the control of the ECU 202. The TCU 201 may function as a wireless communication unit.

The MID 298 is a multi-information display. The IVI 299 is, for example, an in-vehicle infotainment information device (IVI). The Mid 298 and the IVI 299 can function as display control units. The IVI 299 has a wireless LAN communication function. The IVI 299 receives the update program transmitted from the update management server 70 via the wireless LAN communication based on the control of the ECU 202.

Each of the ECU 204, the ECU 205, the ECU 206, and the ECU 207 is an ECU as a vehicle control unit that controls at least a part of the vehicle 20. The ECU 204, the ECU 205, the ECU 206, and the ECU 207 are examples of a "moving object control unit". The ECU 204, the ECU 205, the ECU 206, and the ECU 207 control various devices to be controlled, which are included in the vehicle 20. The device to be controlled includes, for example, a fuel injection device, a battery, a locking device, various sensors, or the like. In the present embodiment, the ECU 204 controls a FI 294 that is the fuel injection device, and acquires information detected by the FI 294. In addition, the ECU 205, the ECU 206, and the ECU 207 respectively control sensors such as a sensor 295, a sensor 296, and a sensor 297, and acquire the sensor data detected by the respective sensors.

In the present embodiment, the system configuration in which the control system 200 includes the TCU 201, the ECU 202, the ECU 204, the ECU 205, the ECU 206, the ECU 207, the MID 298, and the IVI 299 is illustrated; however, the system configuration of the control system 200 is not limited to the example of the present embodiment. In addition, as an illustration in the present embodiment, a description in which moving object control units that can be targets of program updates are the ECU 204 and the ECU 205, and the ECU 202 functions as an update control device that controls the program update is made. It should be noted that the moving object control unit that can be the target of the program update is not limited to these ECUs. The moving object control unit that can be the target of the program update may be any of the TCU 201, the ECU 202, the ECU 204, the ECU 205, the ECU 206, the ECU 207, the MID 298, and the IVI 299.

The ECU 202 controls the ECU 205, ECU 206, and the ECU 207 to acquire the sensor data from the sensor 295, the sensor 296, and the sensor 297. In addition, the ECU 202 keeps, in an internal memory, the current version information of a program that controls an operation of the ECU 204. The ECU 202 transmits, to the update management server 70, the sensor data collected from the sensor 295, the sensor 296, and the sensor 297 through the TCU 201. At this time, the ECU 202 transmits, to the update management server 70, information including the current version information of the ECU 204 and the ECU 205.

Here, the program update will be described. Program update processing, when a device that is the target of the program update is the ECU and a memory for storing firmware of the ECU is a single bank memory (so-called a one-sided ROM), will be described. In this case, there is one program storage area for storing the firmware of the ECU, and thus when the ECU is operating according to the program stored in the program storage area, it is not possible to write the update program to the program storage area. When performing the program update of the ECU, the ECU 202 transfers the update program to the ECU, causes the update program to be stored in a predetermined data storage area of the ECU, and then instructs the ECU to perform the program update. When the program update is instructed, the ECU executes a control code for performing the program update, and writes, to the program storage area, the update program transferred to the data storage area, to activate the update program. The activating of the update program includes, for example, processing of setting startup parameters of the ECU such that the update program is loaded when the ECU starts up and the control is started based on the update program.

Next, the program update processing, when the internal memory of the ECU is a double bank memory (so-called a two-sided ROM), will be described. In this case, the ECU has two program storage areas for storing the firmware, and thus when the ECU is operating according to the program stored in a first program storage area, it is possible to write the update program to a second program storage area. That is, by so-called rear surface writing, it is possible to write the update program to the second program storage area that is a rear surface. Accordingly, for example, even while the vehicle 20 is traveling, it is possible to write the update program to the second program storage area. Therefore, when transferring the update program to the ECU, ECU 202 instructs the ECU to write the update program to the second program storage area. When the update program is completely written to the second program storage area of the ECU, the ECU is in a state in which the program update is possible. When the ECU202 performs the program update of the ECU, the ECU202 instructs the ECU to activate the update program written to the second program storage area. The activating of the update program includes, for example, processing of setting startup parameters of the ECU such that the update program stored in the second program storage area is loaded when the ECU starts up and the control is started based on the update program. For example, the activating of the update program includes processing of validating the second program storage area as a read area of the program, and processing of invalidating the first program storage area as the read area of the program. In this way, the "program update" is a concept including providing the instruction to write the update program to the program storage area of the ECU. In addition, the "program update" is a concept including providing the instruction to activate the update program written to the program storage area. By the activation being completed, the existing program is rewritten by a new update program.

For the program update of the ECU with the internal memory of the single bank memory, there is a possibility that the ECU cannot control the vehicle in a period during which the update program is written to the program storage area, and a period during which the update program is activated. On the other hand, for the program update of the ECU with the internal memory of the double bank memory, in a period during which the update program is written to the program storage area on the rear surface (an inactive surface), the ECU can control the vehicle by the program stored on the other surface (an active surface).

Figure 3:
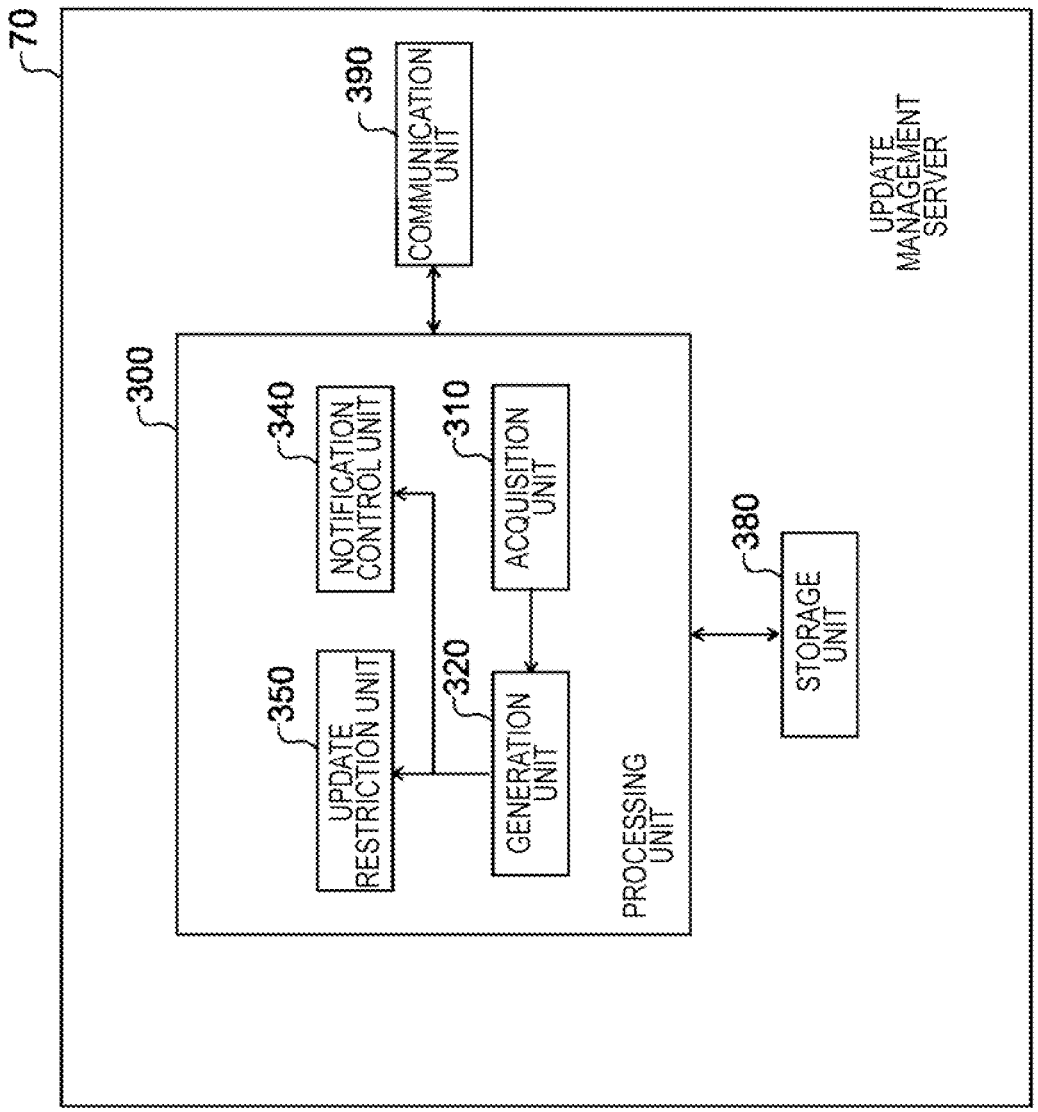
FIG. 3 shows a system configuration of an update management server 70.

FIG. 3 shows a system configuration of an update management server 70. The update management server 70 includes a communication unit 390, a storage unit 380, and a processing unit 300.

The processing unit 300 is realized, for example, by a calculation processing device including a processor. The storage unit 380 is realized to include a non-volatile storage medium. The processing unit 300 performs processing by using information stored in the storage unit 380. The communication unit 390 is responsible for communications with the plurality of vehicles including the vehicle 20.

The processing unit 300 may include an acquisition unit 310, a generation unit 320, a notification control unit 340, and an update restriction unit 350.

The acquisition unit 310 acquires, from each of the plurality of vehicles, the version information of the program of the ECU that controls at least a part of each vehicle, and vehicle information which is information detected by each vehicle. The generation unit 320 generates the normal range information indicating the normal range of the vehicle information for each version of the program of the ECU based on the version information and the vehicle information acquired by the acquisition unit 310. Based on the vehicle information detected by the vehicle whose program of the ECU is a first version among the plurality of vehicles, the generation unit 320 generates the normal range information of the first version, and in a case of generating the normal range information of a second version newer than the first version, the generation unit 320 identifies, among the plurality of vehicles, a vehicle whose vehicle information detected when the version of the program of the ECU is the first version is within the normal range of the first version, and the generation unit 320 uses the vehicle information detected by the identified vehicle when the version of the program of the ECU of the identified vehicle is the second version, to generate the normal range information of the second version.

The acquisition unit 310 may acquire, from each of the plurality of vehicles, the version information of the program of each of the plurality of ECUs that controls at least a part of each vehicle, and the vehicle information. The generation unit 320 may generate the normal range information for each combination of the versions of the programs of the plurality of ECUs based on the version information and the vehicle information acquired by the acquisition unit 310.

The acquisition unit 310 may further acquire type information indicating a type of hardware of the device to be controlled, which is controlled by the ECU. The generation unit 320 may generate the normal range information for each combination of the version of the program of the ECU, and the type of hardware based on the type information and the vehicle information acquired by the acquisition unit 310.

The vehicle information may include information indicating movement states of the plurality of vehicles. The generation unit 320 may generate the normal range information for each movement state of the vehicle.

The movement state of the vehicle may include at least one of a stopped state, an accelerating state, a constant speed movement state, and a decelerating state.

The notification control unit 340 identifies, among the plurality of vehicles, a vehicle that has detected the vehicle information outside the normal range of the version of the program of the ECU, and controls a notification to a user associated with the identified vehicle. The update restriction unit 350 restricts rewriting the program of the ECU by the program of the second version when the normal range of the first version has a single range and the normal range of the second version has a plurality of ranges.

FIG. 4 shows an example of a data structure of sensor information which is managed by the update management server 70. The sensor information is stored in the storage unit 380. The sensor information includes a "VIN", a "program version 1", and a "program version 2".

The "VIN" is information for identifying a vehicle. The "program version 1" is, for example, version information of the program of the ECU 204. The "program version 2" is, for example, version information of the program of the ECU 206. The sensor information is sensor data detected by the sensor 295 to sensor 297. In the vehicle 20, when transmitting the sensor data detected by the sensor 295 to sensor 297 to the update management server 70, the ECU 202 transmits the VIN, the program version 1, and the program version 2 to the update management server 70. The acquisition unit 310 stores, in the sensor information, the sensor data acquired from each vehicle.

Figure 5:
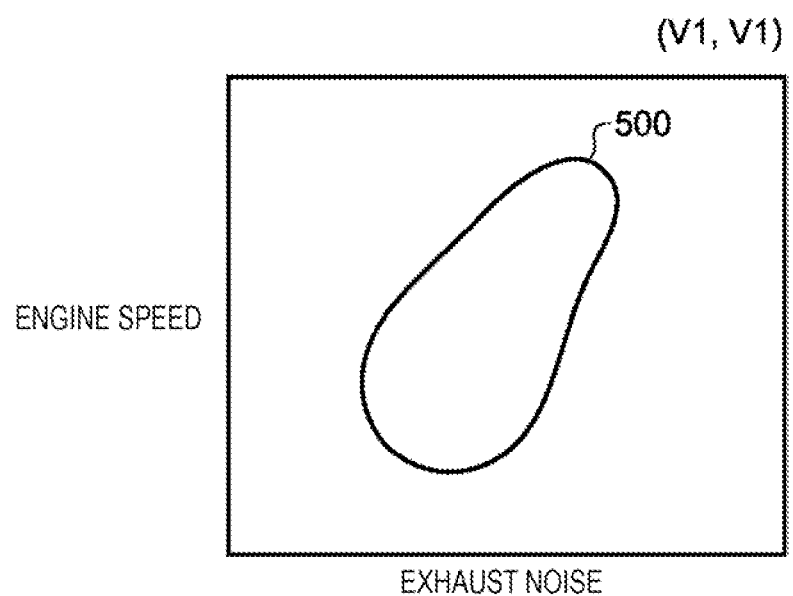
FIG. 5 schematically shows an example of normal range information.

FIG. 5 schematically shows an example of normal range information. A normal range 500 of FIG. 5 shows a normal range in a two-dimensional space in which exhaust noise and an engine speed are used as parameters. In FIG. 5, (V1, V1) indicates the normal range for information detected when the version of the program of the ECU 204 is V1, and the version of the program of the ECU 206 is V1.

An outline of processing in a case of specifying the normal range 500 will be described. The generation unit 320 of the update management server 70 extracts the data of the exhaust noise and the engine speed from the sensor data stored in the sensor information for each combination of the program versions. For example, the generation unit 320 acquires, from the sensor information, data associated with (program version 1, program version 2)=(V1, V1). The generation unit 320 performs plotting in the two-dimensional space, in which the exhaust noise and the engine speed are used as the parameters, by using the acquired data. The generation unit 320 generates a distribution model representing a density distribution in the two-dimensional space, in which the exhaust noise and the engine speed are used as the parameters, by a method such as kernel density estimation. The generation unit 320 determines the normal range 500 based on the distribution model. For example, the generation unit 320 determines, as the normal range 500, a range having a distribution density higher than a predetermined value in the two-dimensional space in which the exhaust noise and the engine speed are used as the parameters.

In a case where the data of the exhaust noise and the engine speed collected from the vehicle is plotted in the two-dimensional space of the exhaust noise and the engine speed, when the exhaust noise and the engine speed are within the normal range 500, it is possible to determine that the sensor data is within the normal range. On the other hand, when the exhaust noise and the engine speed are not within the normal range 500, it is possible to determine that the sensor data is not within the normal range. It should be noted that in the present embodiment, the sensor data is exemplified by the exhaust noise and the engine speed; however, the data to be modeled is not limited to this, and may be various sensor values (including information based on the sensor values) which are acquired by devices mounted on the vehicle, or information relating to a control state of a control device. For example, it is possible to apply not only a vehicle speed, acceleration, an angular velocity, an engine temperature, a battery temperature, but also various pieces of vehicle information such as an accelerator throttle opening sensor value, an atmospheric pressure sensor value, a brake switch, mileage, a radiator water temperature sensor value, an engine operation time, an oxygen sensor value, an air-fuel ratio sensor value, an intake air temperature at a start, a battery voltage, a gear position, an intake air temperature sensor, information relating to engine idling stop mode, an ignition timing, an ignition input voltage, an immobilizer, a crank sensor, a count of misfires detected by a pulse variation from a crank sensor, an undetected pulse count of a top dead center sensor, a purge control solenoid valve operation percentage, a cooling water temperature sensor value for an engine, inverter, or the like, a start clutch, a torque converter slip rate, a fuel cut control state, an airflow sensor value, an idling control state, a misfire detection learning state, an ignition timing correction value for a knock control, a short-term correction of fuel supply, a long-term correction of fuel supply, an ignition timing delay in preventing knocking, a carbon clogging rate of a drive by wire throttle, an idling torque correction value, a valve opening value for an exhaust gas recirculation device, a valve opening indication value for an exhaust gas recirculation device, a valve opening sensor value for an exhaust gas recirculation device, a cylinder misfire detection state, a noise counter value of a crank sensor, a pulse noise counter value of a top dead center sensor, a misfire counter value of a crank sensor detection, a throttle valve opening, idling control target throttle opening value, a throttle opening target value, an injector control state, target idling engine speed, a cooling water temperature at a start, a variable valve timing control CAM angle, and a variable valve timing control solenoid control state. Thereby, it is possible to collect the vehicle data on various evaluation axes, and thus it is possible to check and specify defects from various angles.

Figure 6:
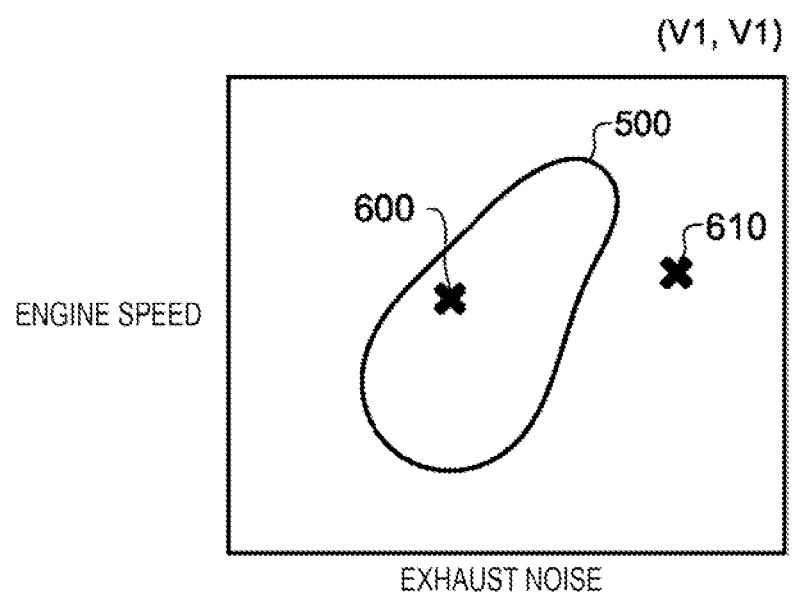
FIG. 6 is a diagram for describing a determination using a normal range 500.

FIG. 6 is a diagram for describing a determination using a normal range 500. It is assumed that the exhaust noise and the engine speed of the sensor data, associated with (V1, V1) and collected from a certain vehicle, are plotted at a location indicated at a data point 600 of FIG. 6 in the two-dimensional space. This data point 600 is within the normal range 500, and thus the exhaust noise and the engine speed of the sensor data detected from the vehicle can be considered to be normal.

On the other hand, it is assumed that the exhaust noise and the engine speed of the sensor data, associated with (V1, V1) and collected from a certain vehicle, are plotted at a location indicated at a data point 610 of FIG. 6 in the two-dimensional space. The data point 610 is outside the normal range 500, and thus the notification control unit 340 notifies a user of the vehicle, of the message urging for the dealer to check the vehicle.

Figure 7:
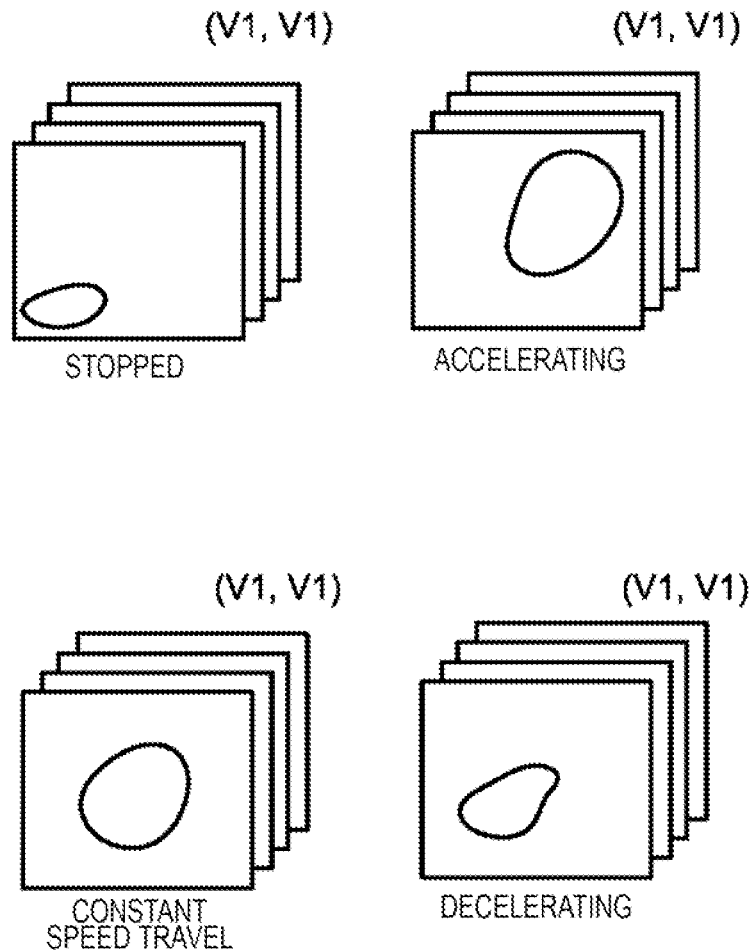
FIG. 7 schematically shows an example of the normal range information generated for each type of movement state of a vehicle.

FIG. 7 schematically shows an example of the normal range information generated for each type of movement state of a vehicle. FIG. 7 illustrates, as the movement states, states "stopped", "accelerating", "constant speed travel", and "decelerating". The generation unit 320 specifies the movement state of the vehicle from acceleration data and speed data collected from the vehicle. In addition to the combination of the versions of the programs of the ECUs, the generation unit 320 generates the normal range information for each movement state. In addition, the generation unit 320 generates a plurality of pieces of normal range information for each movement state by using not only the combination of the exhaust noise and the engine speed illustrated in FIG. 5 and FIG. 6, but also sensor data in a combination of pieces of sensor data that correlate with each other. This makes it possible to make a determination in more detail according to the movement state of the vehicle.

Figure 8:
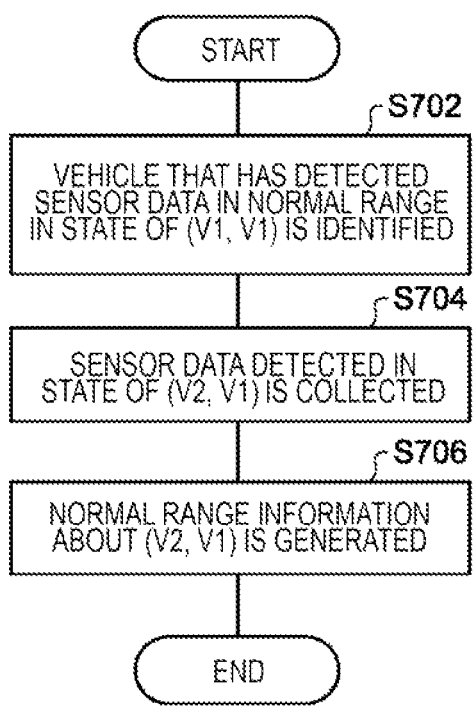
FIG. 8 shows an example of a procedure for executing a process for generating the normal range information corresponding to a version "V2" of a program of an ECU 204.

FIG. 8 shows an example of a procedure for executing a process for generating the normal range information corresponding to a version "V2" of a program of an ECU 204. In S702, with reference to the sensor information, the generation unit 320 identifies, a vehicle that has detected the sensor data in the normal range, in the state of (V1, V1) in the past, before performing the program update of the ECU 204. In S704, the generation unit 320 collects the sensor data detected by a vehicle in a state of (V2, V1), the vehicle being identified in S702. In S706, the generation unit 320 generates normal range information of (V2, V1) by using the sensor data collected in S704. In this way, it is possible to extract the vehicle that has detected the sensor data in the normal range before the program update, and to generate the normal range information by using the sensor data detected by the extracted vehicle in a state after the program update. Therefore, it is possible to appropriately determine whether the sensor data is within the normal range for the vehicle that has performed the program update.

Figure 9:
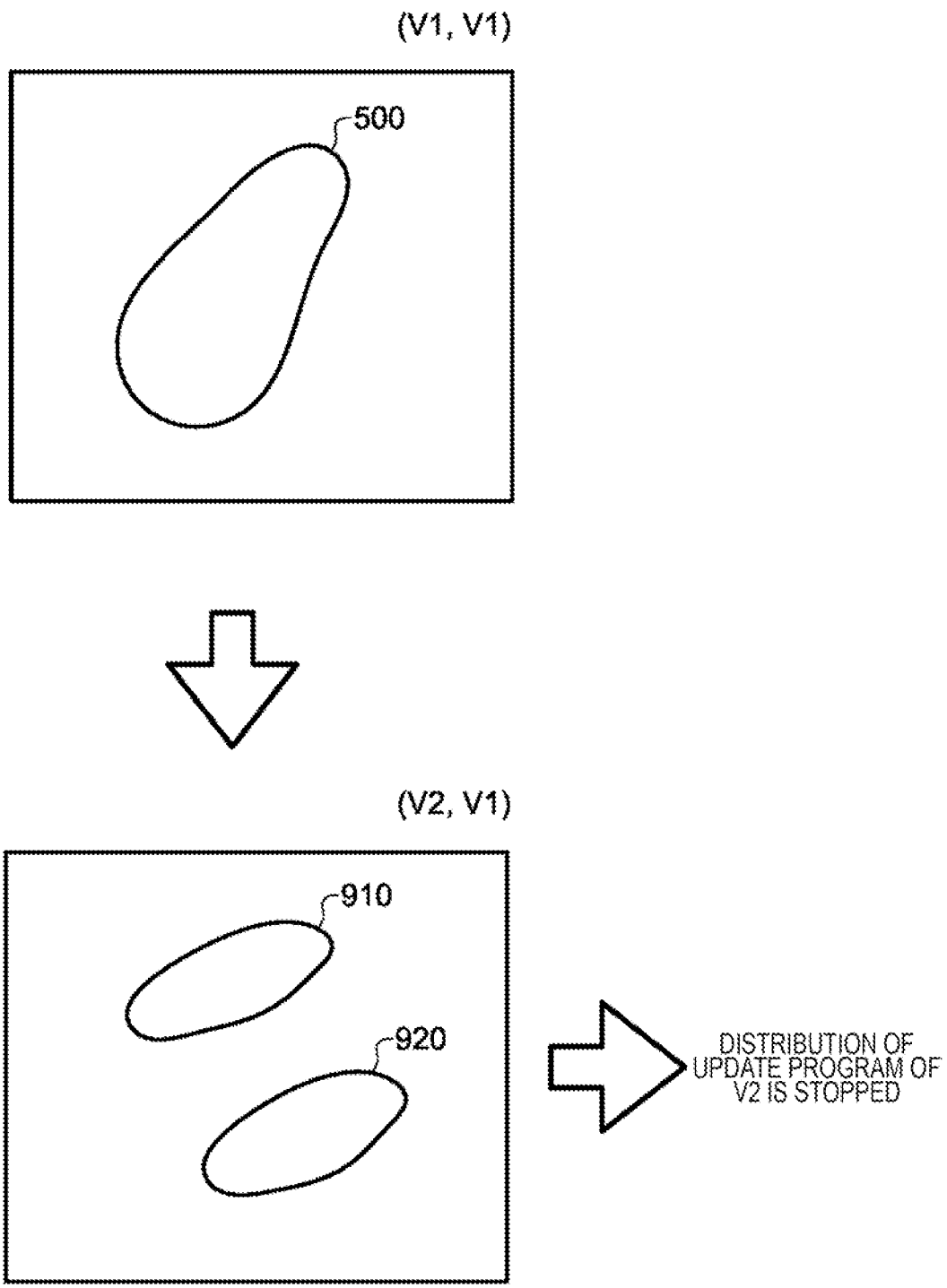
FIG. 9 is a diagram for describing a case in which a distribution of an update program is stopped based on the normal range information generated after a program update.

FIG. 9 is a diagram for describing a case in which a distribution of an update program is stopped based on the normal range information generated after a program update. As shown in FIG. 9, the normal range 500 in (V1, V1) indicates a single range, while the normal range in (V2, V1) is divided into a first normal range 910 and a second normal range 920. In this way, while the normal range generated from the sensor data detected before the program update has a single range, when the normal range generated from the sensor data detected after the program update is divided into the plurality of ranges, the update restriction unit 350 causes the update program of the version V2 of the ECU 204 not to be distributed to the vehicle 20.

As a cause by which the normal range is divided into the plurality of ranges, there is a possibility that manufacturers or the like of the sensors are different from each other. For example, it is possible to consider a possibility that the sensors manufactured by the different manufacturers cannot be correctly controlled by the updated program, thereby dividing the normal range into the plurality of ranges. Therefore, by stopping the distribution of the update program to the vehicle 20, it is possible to suppress the distribution of the update program to a large number of vehicles.

FIG. 10 shows a data structure of sensor information in a modification example in a table format. The sensor information shown in FIG. 10 has a data item of a "hardware type", in addition to the data items of the sensor information shown in FIG. 4. The "hardware type" is information for identifying the type of hardware of the sensor 296. As described above, the plurality of manufacturers may provide the sensors. In this case, the normal range may be different for each manufacturer of the sensor. In order to handle such a case, the vehicle transmits, to the update management server 70, the information including the hardware type of the sensor along with the sensor data. Then, the generation unit 320 generates the normal range for each of any combinations of the version of the program and the type of hardware. It should be noted that the hardware type is a concept that includes the version of the hardware.

It should be noted that not only in a case where the normal range is divided by the program update, but also in a case where a shape, a size, and a location of the normal range are completely different before and after the program update, the update restriction unit 350 may similarly stop the distribution of the update program to the vehicle 20. For example, when an area where the normal range before the program update and the normal range after the program update overlap each other in the two-dimensional space is smaller than a predetermined value, the distribution of the update program to the vehicle 20 may be stopped.

Figure 11:
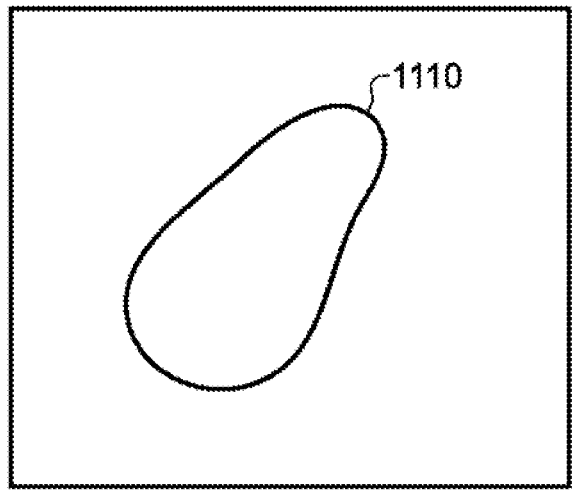
FIG. 11 shows an example of the normal range in consideration of a type of hardware.
Figure 11:
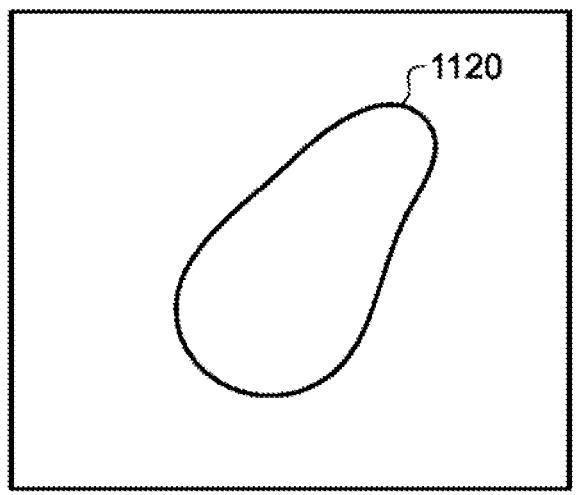

FIG. 11 shows an example of the normal range in consideration of a type of hardware. In FIG. 11, (V1, V1, H1) indicates that the version of the program of the ECU 204 is V1, the version of the program of the ECU 206 is V1, and the type of the sensor 295 is H1. In FIG. 11, (V1, V1, H2) indicates that the version of the program of the ECU 204 is V1, the version of the program of the ECU 206 is V1, and the type of the sensor 295 is H2. A normal range 1110 indicates a normal range generated by the generation unit 320 from the sensor data detected in the vehicle in a combination of (V1, V1, H1). A normal range 1120 indicates a normal range generated by the generation unit 320 from the sensor data detected in the vehicle in a combination of (V1, V1, H2).

In this way, in a case where the difference of the type of hardware can be grasped in advance, it is possible to make a determination by reflecting the difference due to the type of hardware in the normal range. Therefore, it is possible to appropriately determine each vehicle being within the normal range in consideration of the difference in the hardware of each vehicle.

As described above, with the update management server 70, in a case of generating a new version of the normal range information, it is possible to generate the normal range information of the new version, by using the sensor data which is collected from the vehicle that was able to detect the sensor data in the normal range before the program update and which is detected after the program update. Therefore, also in the system that performs the program update, it is possible to generate the normal range information of the new version by using sensor data of a vehicle having a comparatively high probability of being normal.

It should be noted that in the embodiments described with reference to FIG. 3 and subsequent figures, the case of generating the normal range information for each combination of the program versions of two ECUs has been described. However, it is possible to adopt a mode of generating the normal range information for each combination of two or more program versions, and it is possible to adopt a mode of generating the normal range information for the program version of one ECU. In addition, it is also possible to adopt a mode of generating the normal range information for each combination of two or more hardware types.

The vehicle 20 is a vehicle as an example of transportation equipment. The vehicle may be an automobile such as an automobile equipped with an internal combustion engine, an electric vehicle, a fuel cell vehicle (FCV). The automobile includes a bus, a truck, a motorcycle, or the like. The vehicle may be a saddle riding type vehicle, or the like, or may be a bike. The transportation equipment includes, in addition to the vehicle, equipment such as an aircraft including an unmanned aerial vehicle, and a ship. The transportation equipment may be any equipment that transports people or goods. The transportation equipment is an example of the moving object. The moving object is not limited to the transportation equipment, and may be any movable equipment.

Figure 12:
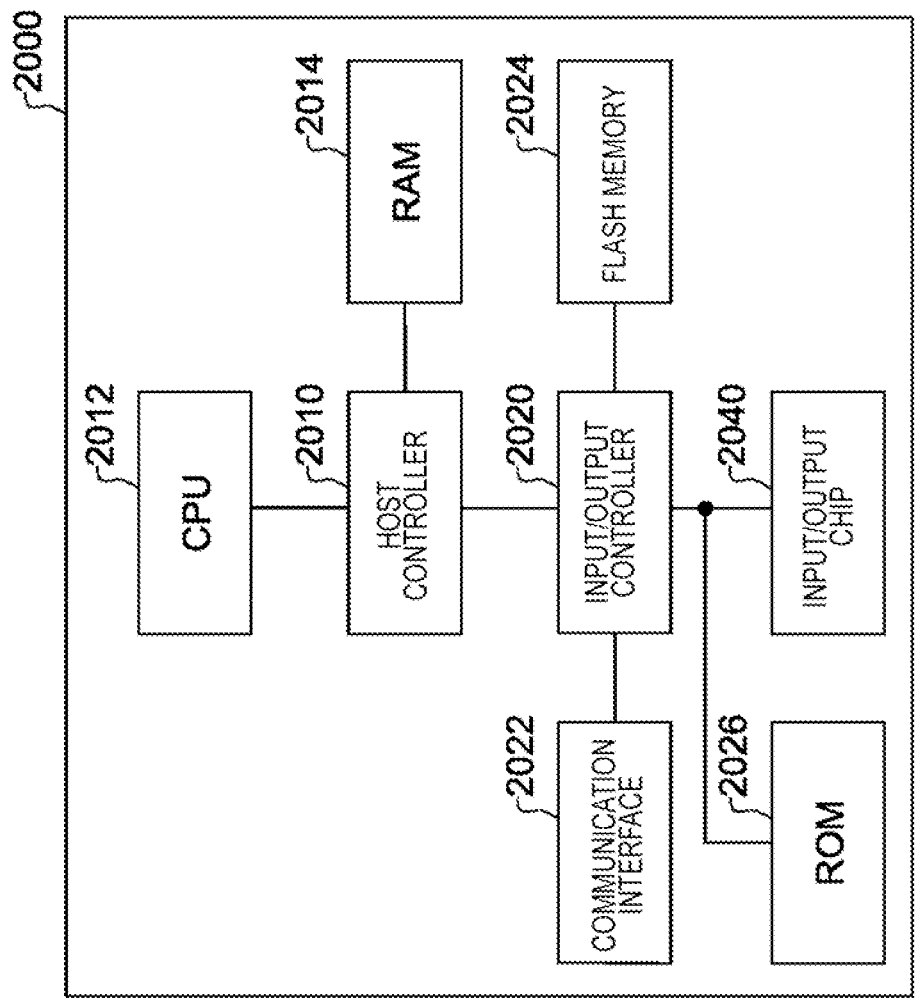
FIG. 12 shows an example of a computer 2000.

FIG. 12 shows an example of a computer 2000 in which a plurality of embodiments of the present invention may be entirely or partially embodied. A program installed on the computer 2000 can cause the computer 2000 to function as a system such as the control system according to the embodiment or each unit of the system, or a device such as the update management server 70 or each unit of the device, or to execute an operation associated with the system or each unit of the system, or the device or each unit of the device, and/or to execute a process or steps of the process according to the embodiment. Such a program may be executed by a CPU 2012 to cause the computer 2000 to execute the specific operation associated with some or all of the blocks of processing procedures and block diagrams described in the present specification.

The computer 2000 according to the present embodiment includes the CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the various types of hardware resources described above. A device or a method may be configured by implementing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and execute various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored in a computer-readable storage medium on the computer 2000 or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program, which is installed on the computer 2000 and causes the computer 2000 to function as the control system 200, may work on the CPU 2012 or the like to cause the computer 2000 to function as each unit of the update management server 70. Information processing written in these programs functions as each unit of the update management server 70 that is specific means by which software and the above-described various hardware resources cooperate by being read by the computer 2000. Then, by the specific means realizing calculation or processing of information according to a purpose of use of the computer 2000 in the present embodiment, the control system 200 according to the purpose of use is constructed.

Various embodiments have been described with reference to the block diagrams or the like. Blocks in the block diagrams may respectively represent (1) steps of processes in which operations are performed or (2) "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable storage medium may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of computer-readable storage medium may include an electronic storage medium, a magnetic storage medium, an optical storage medium, an electromagnetic storage medium, a semiconductor storage medium, etc. Specific examples of the computer-readable storage medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (Registered Trademark) disc, a memory stick, an integrated circuit card, or the like.

Computer-readable instructions may include assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 update system
20 vehicle 70 update management server
90 communication network
200 control system
201 TCU
202 ECU
204 ECU
205 ECU
206 ECU
207 ECU
280 communication network
294 FI
295, 296, 297 sensor
298 MID
299 IVI
310 acquisition unit
320 generation unit
340 notification control unit
350 update restriction unit
2000 computer
2010 host controller
2012 CPU
2014 RAM
2020 input/output controller
2022 communication interface
2024 flash memory
2026 ROM
2040 input/output chip

What is claimed is:

1. An update management server comprising:
at least one processor, wherein
the at least one processor is configured to
acquire, from each of a plurality of moving objects, version information of a program of a moving object control unit that controls at least a part of each moving object, and moving object information which is information detected by each moving object;
generate normal range information indicating a normal range of the moving object information for each version of the program of the moving object control unit based on the acquired version information and the acquired moving object information, wherein
the at least one processor is further configured to
generate, based on the moving object information detected by a moving object when the program of the moving object control unit is a first version among the plurality of moving objects, normal range information of the first version, and
in a case of generating normal range information of a second version newer than the first version,
identify, among the plurality of moving objects, a moving object having moving object information detected when the version of the program of the moving object control unit is the first version is within the normal range of the first version, and
use the moving object information detected by the identified moving object when the version of the program of the moving object control unit of the identified moving object is the second version, to generate the normal range information of the second version; and
the at least one processor is further configured to restrict rewriting the program of the moving object control unit from the program of the first version to the program of the second version when the normal range of the first version has a single range and the normal range of the second version has a plurality of ranges.

2. The update management server according to claim 1, wherein
the at least one processor is configured to
generate the normal range information for each combination of the versions of the programs of the plurality of moving object control units based on the acquired version information and the acquired moving object information.

3. The update management server according to claim 1, wherein
the at least one processor is further configured to
acquire type information indicating a type of hardware of a device to be controlled, which is controlled by the moving object control unit, and
generate normal range information for each combination of the acquired version information of the program of the moving object control unit and the type of hardware based on the type information and the acquired moving object information.

4. The update management server according to claim 1, wherein
the acquired moving object information includes information indicating movement states of the plurality of moving objects, and
the at least one processor is configured to generate the normal range information for each movement state of the plurality of moving objects.

5. The update management server according to claim 1, wherein
each movement state of the plurality of moving objects includes at least one of a stopped state, an accelerating state, a constant speed movement state, and a decelerating state.

6. The update management server according to claim 1, wherein:
the at least one processor is further configured to identify, among the plurality of moving objects, a moving object that has detected the moving object information outside the normal range of the first version or the second version of the program of the moving object control unit, and control a notification to a user associated with the identified moving object.

7. The update management server according to claim 1, wherein
at least one of the plurality of moving objects is a vehicle.

8. The update management server according to claim 2, wherein
the at least one processor is further configured to
acquire type information indicating a type of hardware of a device to be controlled, which is controlled by the moving object control unit, and
generate the normal range information for each combination of the versions of the program of the plurality of moving object control units and the type of hardware based on the acquired type information and the acquired moving object information.

9. The update management server according to claim 2, wherein
the acquired moving object information includes information indicating movement states of the plurality of moving objects, and
the at least one processor is configured to generate normal range information for each movement state of the plurality of moving objects.

10. The update management server according to claim 3, wherein the acquired moving object information includes information indicating movement states of the plurality of moving objects, and
the at least one processor is configured to generate the normal range information for each movement state of the plurality of moving objects.

11. The update management server according to claim 8, wherein
the acquired moving object information includes information indicating movement states of the plurality of moving objects, and
the at least one processor is configured to generate the normal range information for each movement state of the plurality of moving objects.

12. The update management server according to claim 2, wherein
each movement state of the plurality of moving objects includes at least one of a stopped state, an accelerating state, a constant speed movement state, and a decelerating state.

13. The update management server according to claim 3, wherein
each movement state of the plurality of moving objects includes at least one of a stopped state, an accelerating state, a constant speed movement state, and a decelerating state.

14. The update management server according to claim 2, wherein:
the at least one processor is further configured to identify, among the plurality of moving objects, a moving object that has detected the moving object information outside the normal range of either the first version of the program or the second version of the program of the moving object control unit, and to control a notification to a user associated with the identified moving object.

15. The update management server according to claim 3, further comprising:
the at least one processor is further configured to identify, among the plurality of moving objects, a moving object that has detected the moving object information outside the normal range of the first version or the second version of the program of the moving object control unit, and control a notification to a user associated with the identified moving object.

16. An update management method comprising:
acquiring, by at least one processor of an update management server, from each of a plurality of moving objects, version information of a program of a moving object control unit that controls at least a part of each moving object, and moving object information which is information detected by each moving object; and
generating, by the at least one processor, normal range information indicating a normal range of the moving object information for each version of the program of the moving object control unit based on the acquired version information and the acquired moving object information, wherein
the generating of the normal range information indicating the normal range of the moving object information for each version of the program of the moving object control unit, includes
generating, by the at least one processor, based on the moving object information detected by a moving object when the program of the moving object control unit is a first version among the plurality of moving objects, normal range information of the first version, and
generating, by the at least one processor, normal range information of a second version newer than the first version, the generating including
identifying, among the plurality of moving objects, a moving object having moving object information detected when the version of the program of the moving object control unit is the first version is within the normal range of the first version, and
using the moving object information detected by the identified moving object when the version of the program of the moving object control unit of the identified moving object is the first version, to generate the normal range information of the second version,
wherein the method further comprises:
restricting, by the at least one processor, rewriting the program of the moving object control unit from the program of the first version to the program of the second version when the normal range of the first version has a single range and the normal range of the second version has a plurality of ranges.

17. A non-transitory computer-readable storage medium having recorded thereon a program that causes at least one processor of a computer to perform operations comprising:
acquiring, from each of a plurality of moving objects, version information of a program of a moving object control unit that controls at least a part of each moving object, and moving object information which is information detected by each moving object; and
generating normal range information indicating a normal range of the moving object information for each version of the program of the moving object control unit based on the acquired version information and the acquired moving object information, wherein
the generating of the normal range information indicating the normal range of the moving object information for each version of the program of the moving object control unit, includes
generating, based on the moving object information detected by a moving object when the program of the moving object control unit is a first version among the plurality of moving objects, normal range information of the first version, and
generating normal range information of a second version newer than the first version, the generating including
identifying, among the plurality of moving objects, a moving object having moving object information detected when the version of the program of the moving object control unit is the first version is within the normal range of the first version, and
using the moving object information detected by the identified moving object when the version of the program of the moving object control unit of the identified moving object is the first version, to generate the normal range information of the second version, and
wherein the program further causes the at least one processor of the computer to perform operations comprising:
restricting rewriting the program of the moving object control unit from the program of the first version to the program of the second version when the normal range of the first version has a single range and the normal range of the second version has a plurality of ranges.

* * * * *